United States Patent [19]

Hicks

[11] Patent Number: 5,455,655
[45] Date of Patent: Oct. 3, 1995

[54] LAMPHOUSE FOR USE WITH PHOTOGRAPHIC PRINTER

[76] Inventor: Ray Hicks, 4444 W. Bristol Rd., Flint, Mich. 48507

[21] Appl. No.: 231,498

[22] Filed: Apr. 22, 1994

[51] Int. Cl.⁶ ................................................. G03B 27/32
[52] U.S. Cl. .................................. 355/67; 355/37; 355/71
[58] Field of Search ................................. 355/37, 67, 70, 355/71

[56] References Cited

U.S. PATENT DOCUMENTS

| | | | |
|---|---|---|---|
| 3,449,045 | 6/1969 | Roux | 353/31 |
| 3,551,041 | 12/1970 | McGivern | 353/6 |
| 3,630,609 | 12/1971 | Clapp et al. | 355/37 |
| 3,818,216 | 6/1974 | Larraburu | 240/41.3 |
| 3,897,147 | 7/1975 | Simon | 355/37 |
| 4,053,759 | 10/1977 | Wilkinson | 362/218 |
| 4,057,345 | 11/1977 | Ehrenhaft | 355/35 |
| 4,080,072 | 3/1978 | Failes | 355/88 |
| 4,188,111 | 2/1980 | Marvin | 355/37 |
| 4,299,481 | 11/1981 | Chapman | 355/69 |
| 4,368,974 | 1/1983 | Coote et al. | 355/35 |
| 4,372,667 | 2/1983 | Cattelani | 355/1 |
| 4,894,683 | 1/1990 | McGuire et al. | 355/71 |
| 4,896,187 | 1/1990 | Clapp | 355/71 |
| 5,032,866 | 1/1991 | Shoden et al. | 355/38 |
| 5,099,359 | 3/1992 | Hrycin et al. | 359/587 |
| 5,296,890 | 3/1994 | Clapp | 355/37 |
| 5,333,034 | 7/1994 | Gu et al. | 355/32 |

Primary Examiner—Michael L. Gellner
Assistant Examiner—D. P. Malley
Attorney, Agent, or Firm—Young, MacFarlane & Wood

[57] ABSTRACT

A lamphouse for use with a photographic printer for controlling the exposure time of the additive primary colors in the lamphouse and thereby controlling the time of exposure of the light sensitive color print paper. The lamphouse includes a housing adapted to be positioned on the printer proximate the optical stage of the printer and defining a mixing chamber for directing light to the optical stage and a light generating assembly for delivering light to the mixing chamber. The light generating assembly is constructed as a plurality of structurally distinct modular subassemblies and the housing includes parallel side by side tracks to individually slidably receive each modular subassembly. Each modular subassembly is positioned in the housing and removed from the housing by sliding the modular subassembly along the respective track in the housing. As the modular subassembly is inserted into the housing on the track an electrical connector on the subassembly automatically connects with a circuit board positioned in the housing in perpendicular relation to the tracks.

18 Claims, 10 Drawing Sheets

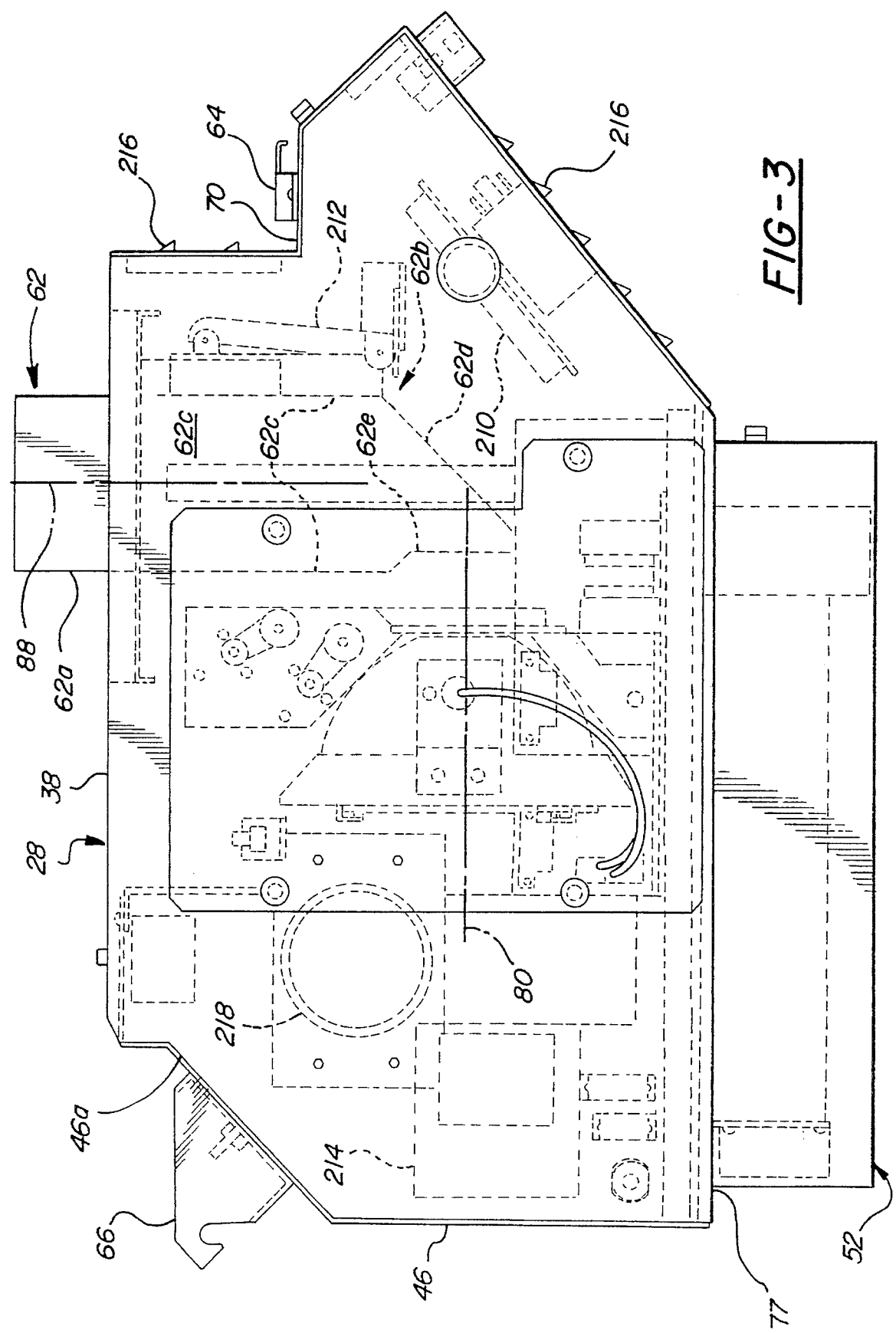

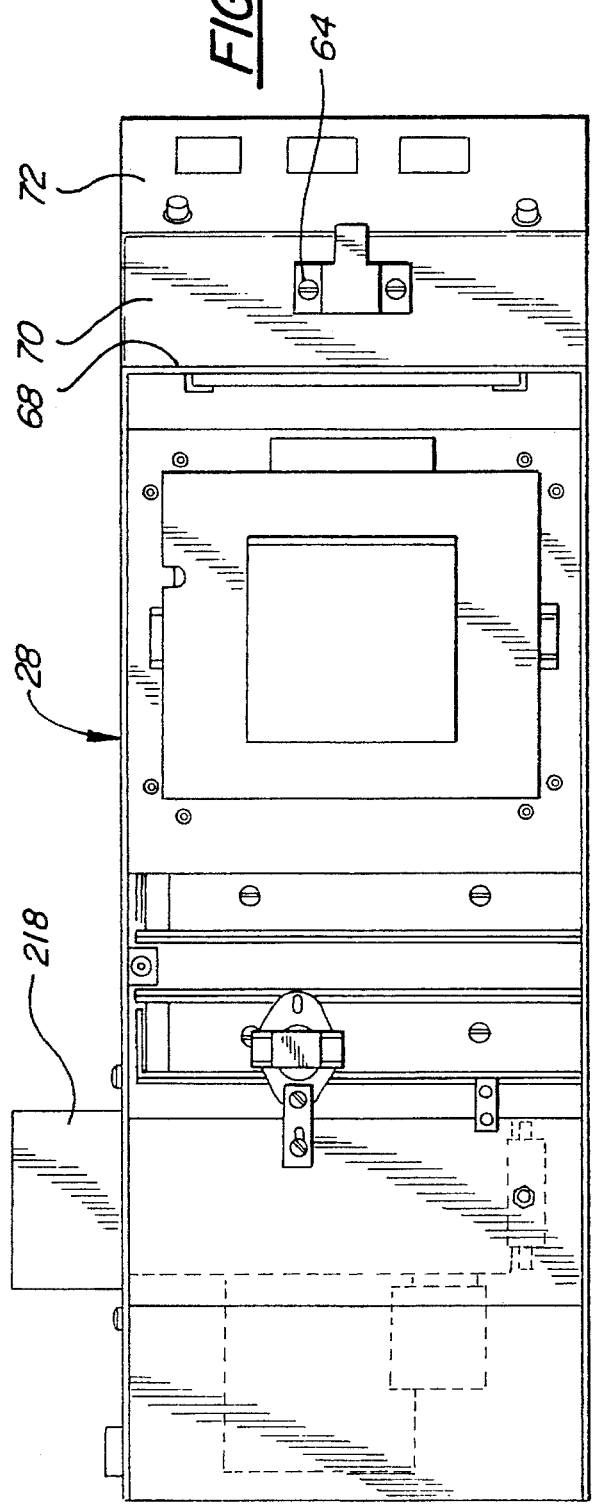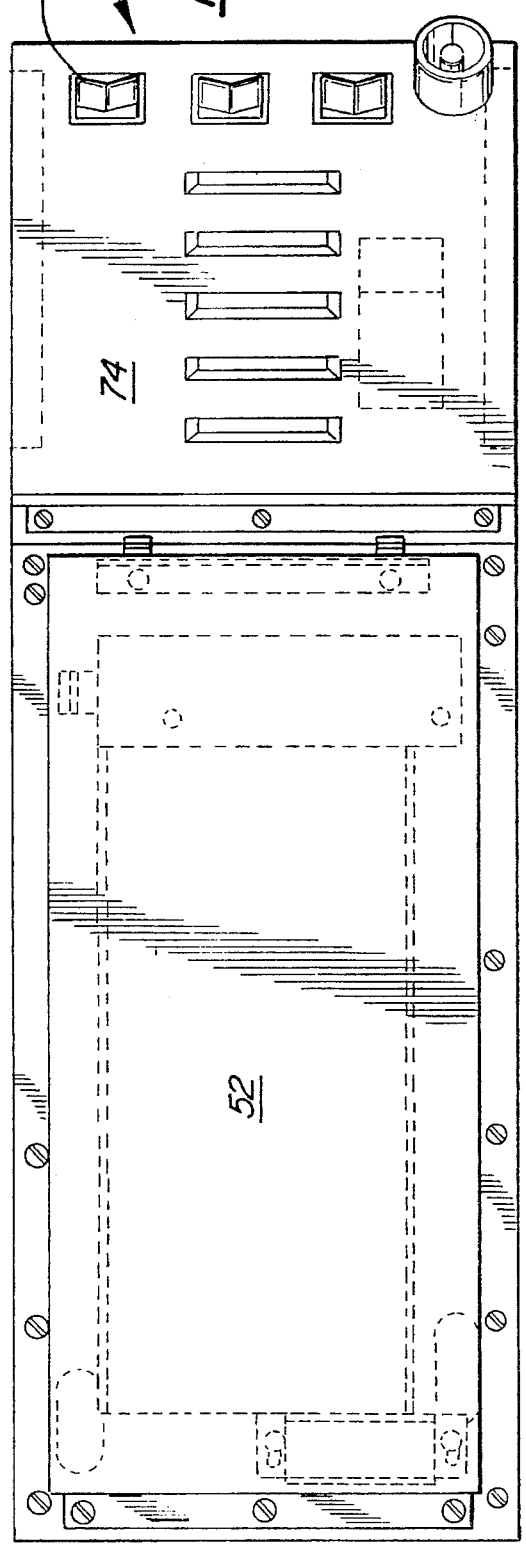

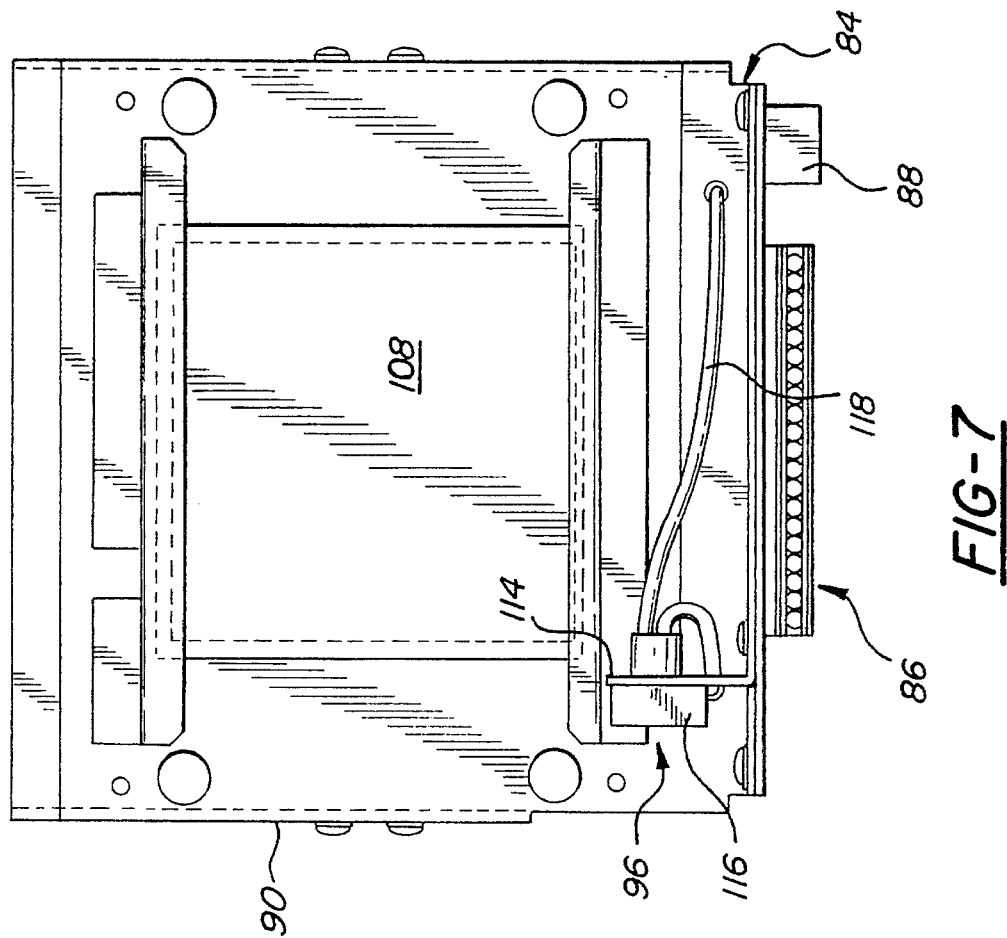
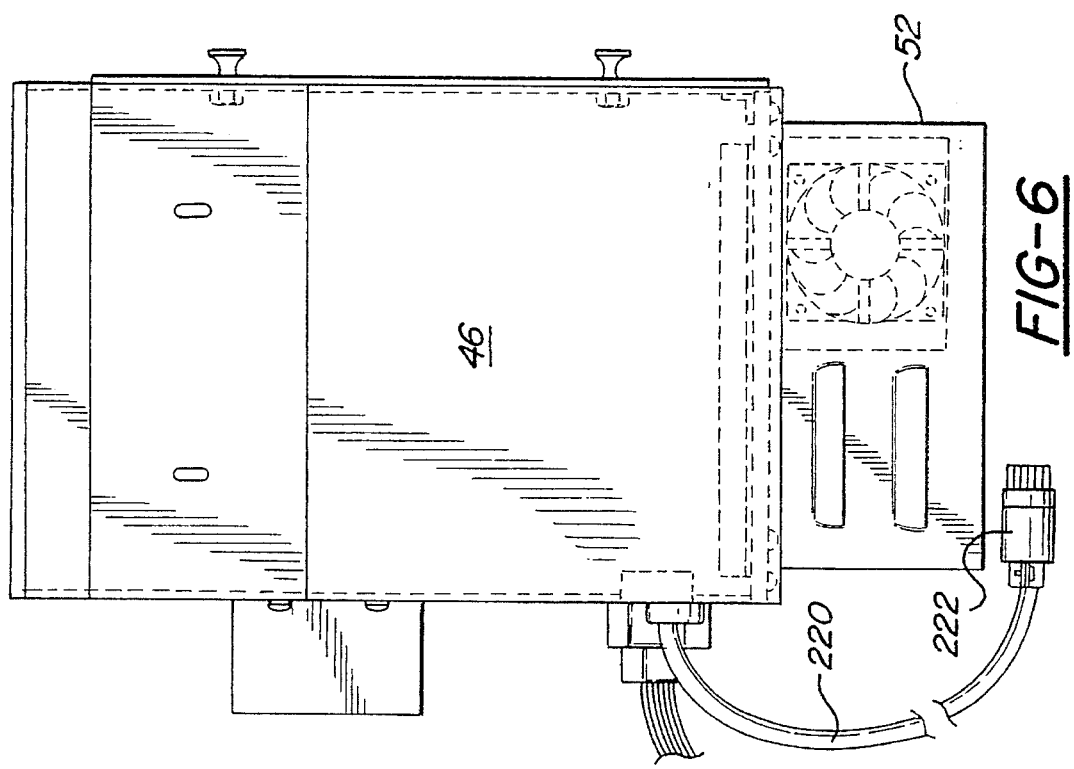

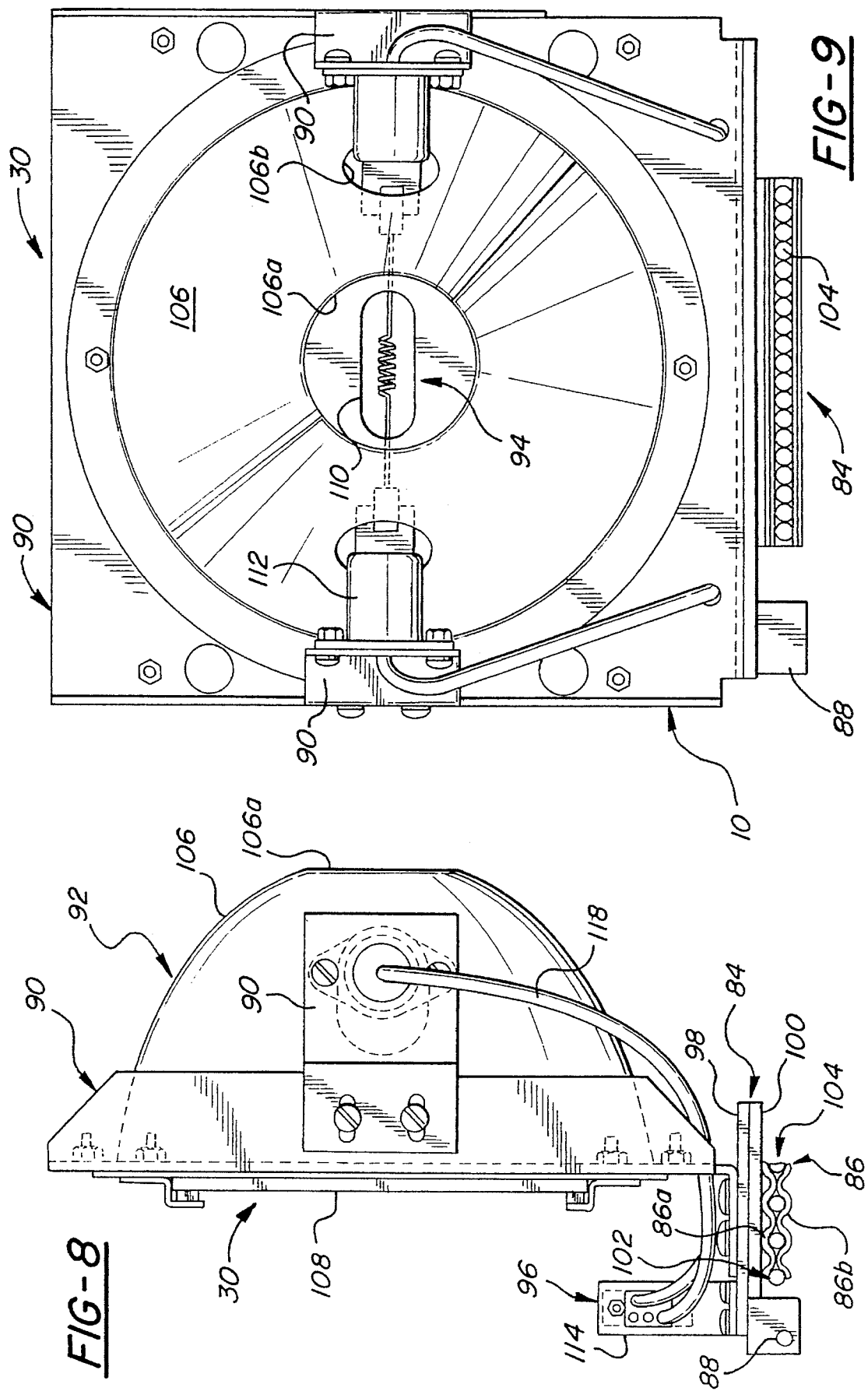

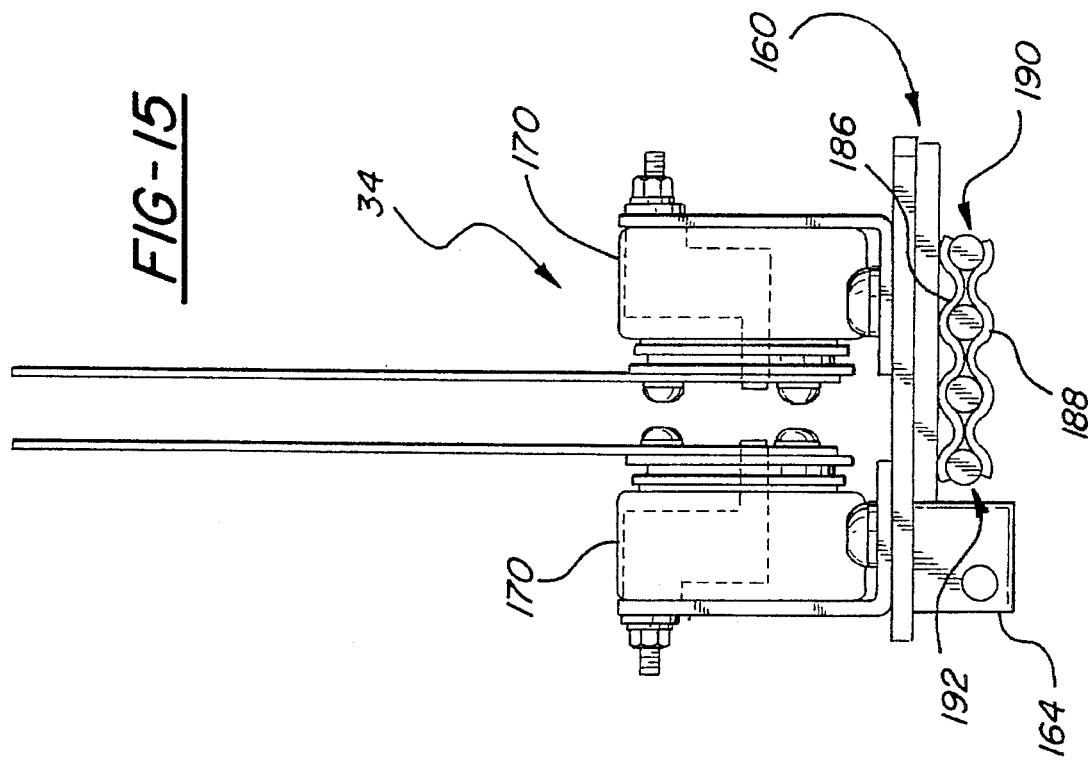
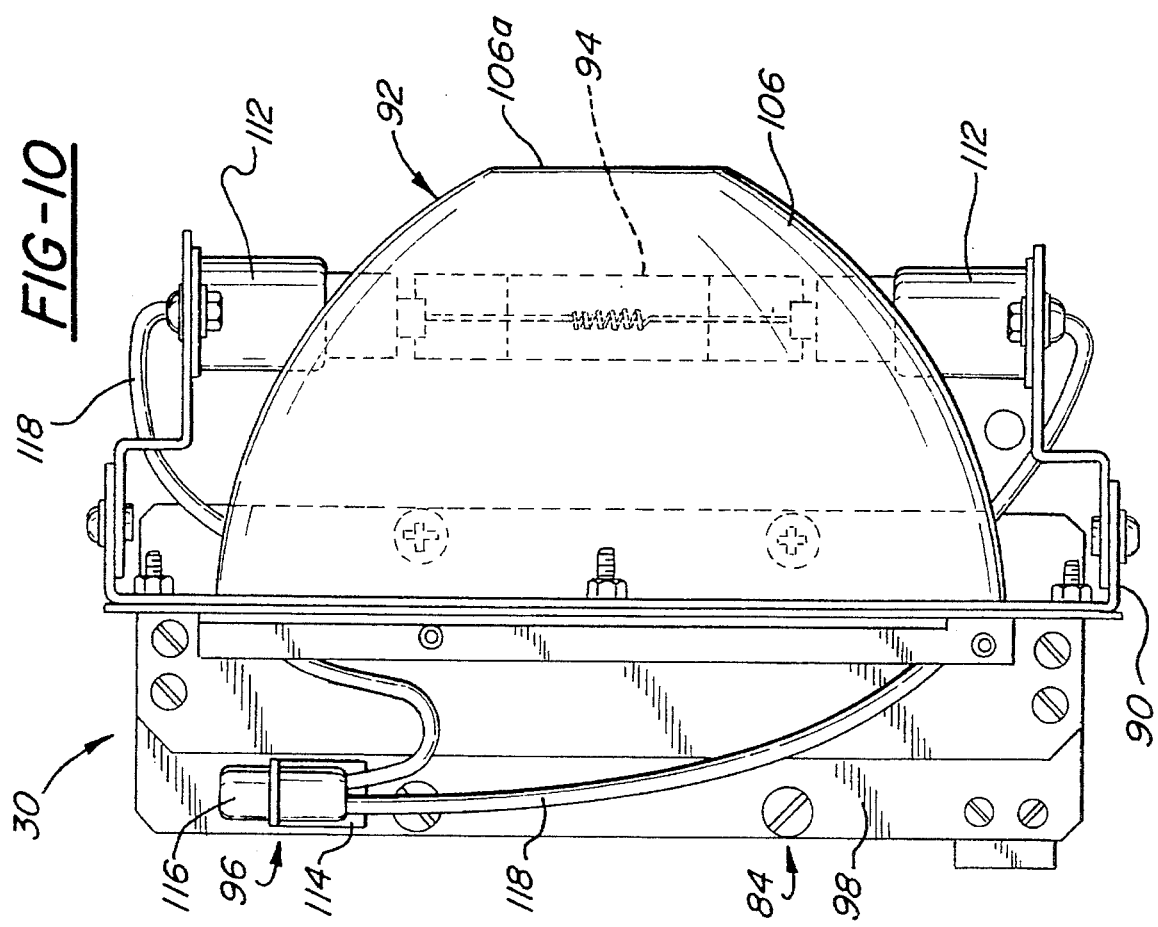

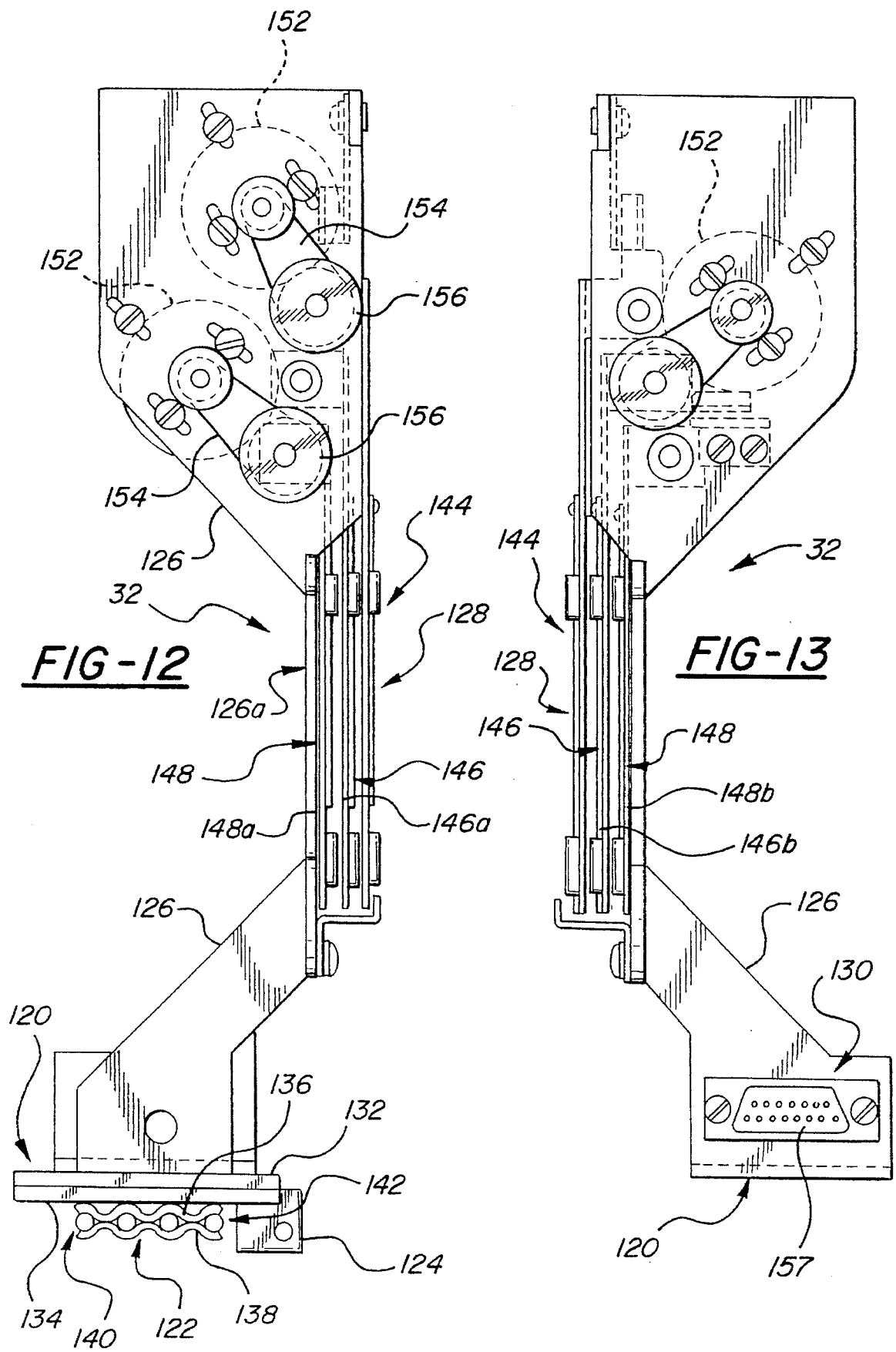

LAMPHOUSE FOR USE WITH PHOTOGRAPHIC PRINTER

BACKGROUND OF THE INVENTION

This invention relates to lamphouses and more particularly to an additive tricolor lamphouse for use with a photographic printer for controlling the exposure time of the additive primary colors in the lamphouse and thereby controlling the time of exposure of the light sensitive color print paper.

A photographic printer lamphouse typically includes a housing adapted to be positioned on the printer proximate the optical stage and defining a mixing chamber for directing light to the optical stage and a light generating assembly for delivering light to the mixing chamber for delivery to the optical stage. The light generating assembly typically includes a lamp subassembly and one or more filter subassemblies positioned between the lamp subassembly and the mixing chamber and operative to selectively filter the light emanating from the lamp subassembly prior to its introduction into the mixing chamber for delivery to the optical stage.

Whereas lamphouses of this general character are effective in delivering a properly filtered and properly timed multicolor light source to the optical stage, they are not easily serviceable. Specifically, in the event of a failure of one or more of the components of the lamphouse, the entire lamphouse must be removed from the printer, the lamphouse must be disassembled, the defective component must be repaired, the components must be reassembled, and the lamphouse must be replaced on the printer. Servicing of the lamphouse is therefore expensive and time-consuming and, most importantly, results in considerable downtime for the associated printer.

SUMMARY OF THE INVENTION

This invention is directed to the provision of an improved lamphouse for use with a photographic printer.

More specifically, this invention is directed to the provision of a lamphouse for a photographic printer wherein the lamphouse may be readily, inexpensively, and quickly serviced.

The lamphouse of the invention is intended for use with a photographic printer having an optical stage and includes a housing adapted to be positioned on the printer proximate the optical stage and defining a mixing chamber for directing light to the optical stage and a light generating assembly for delivering light to the mixing chamber for delivery to the optical stage.

According to the invention, the light generating assembly is constructed as a plurality of structurally distinct modular subassemblies and the housing includes mounting means to individually slidably receive each modular subassembly. This arrangement facilitates servicing of the lamphouse, allowing the isolation of the component needing repair and the ready removal of the modular subassembly incorporating the defective component.

According to a further feature of the invention, the modular subassemblies are received in the housing in parallel relation. This arrangement allows the subassemblies to be compactly positioned within the housing while maintaining the ready serviceability.

According to a further feature of the invention, the modular subassemblies include a lamp subassembly, a first filter subassembly positioned between the lamp subassembly and the mixing chamber, and a second filter subassembly positioned between the first filter subassembly and the mixing chamber. This specific arrangement isolates the components of the lamphouse in functional subassemblies and places the functional subassemblies in proper operative relationship so as to deliver a properly filtered and properly timed light source to the mixing chamber. In the disclosed embodiment of the invention, the first filter subassembly comprises a trim filter subassembly and the second filter subassembly comprises a cut-off filter shutter subassembly.

According to a further feature of the invention, the mounting means in the housing for the modular subassemblies includes a plurality of slide tracks positioned in parallel side-by-side relation within the housing. This arrangement allows the modular subassemblies to be readily moved into and out of the housing to facilitate servicing of the lamphouse.

In the disclosed embodiment of the invention, each track has an upwardly opening groove configuration; each modular subassembly includes a tongue structure at the lower end of the subassembly sized to fit slidably in the groove configuration of each track; the groove configuration of each track includes parallel upstanding side walls; and each tongue structure includes a pair of closed loop ball race assemblies with one ball race assembly rollably engaging each side wall of the respective track.

According to a further feature of the invention, the lamphouse includes a circuit board positioned within the housing generally normal to the slide tracks and each modular subassembly includes an electrical connector movable into electrical connection with a respective connector on the circuit board in response to sliding insertion of the modular subassembly into the housing on the respective track. This arrangement facilitates servicing of the subassemblies by automatically connecting and disconnecting the modular subassemblies from the circuit board of the lamp housing in response to insertion and removal of the modular subassemblies.

According to a further feature of the invention, a plurality of spaced housing stop locks are positioned within the housing and each modular subassembly includes a stop block for abutting coaction with the respective housing stop lock to determine the fully inserted position of the modular subassembly within the housing. This arrangement allows the modular subassemblies to be precisely repositioned within the housing following their removal for servicing purposes. In the disclosed embodiment of the invention, the lamphouse further includes fasteners operative to fixedly but releasably secure the respective modular subassembly stop blocks to the housing stop blocks so as to fixedly but readily releasably secure each modular subassembly in the housing.

BRIEF DESCRIPTION OF THE DRAWING

FIG. 3 is a side elevational cross-sectional view of the invention lamphouse;

FIG. 4 is a top view of the invention lamphouse;

FIG. 5 is a bottom view of the invention lamphouse;

FIG. 6 is an end view of the invention lamphouse;

FIGS. 7, 8, 9, and 10 are rear, side, front, and top views of a lamp subassembly utilized in the invention lamphouse;

FIGS. 11, 12, and 13 are front, side, and right side views of a trim filter subassembly utilized in the invention lamphouse;

FIGS. 14, 15, and 16 are front, side, and top views of a cut-off filter subassembly utilized in the invention lamphouse.

DESCRIPTION OF THE PREFERRED EMBODIMENT

Figure 1:
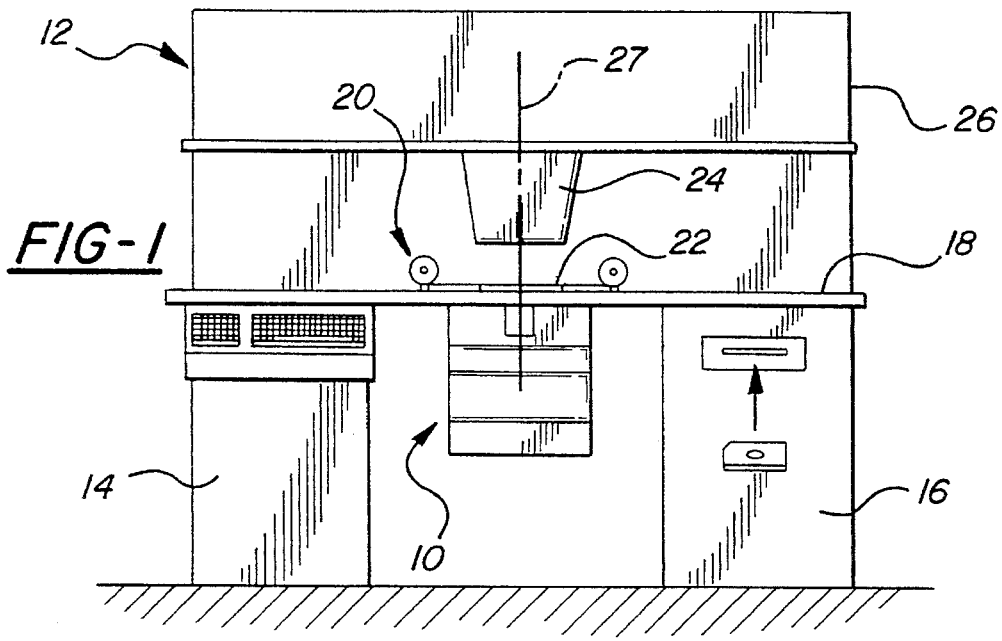
FIG. 1 is a frontal view of a photographic printer including a lamphouse according to the invention.
Figure 2:
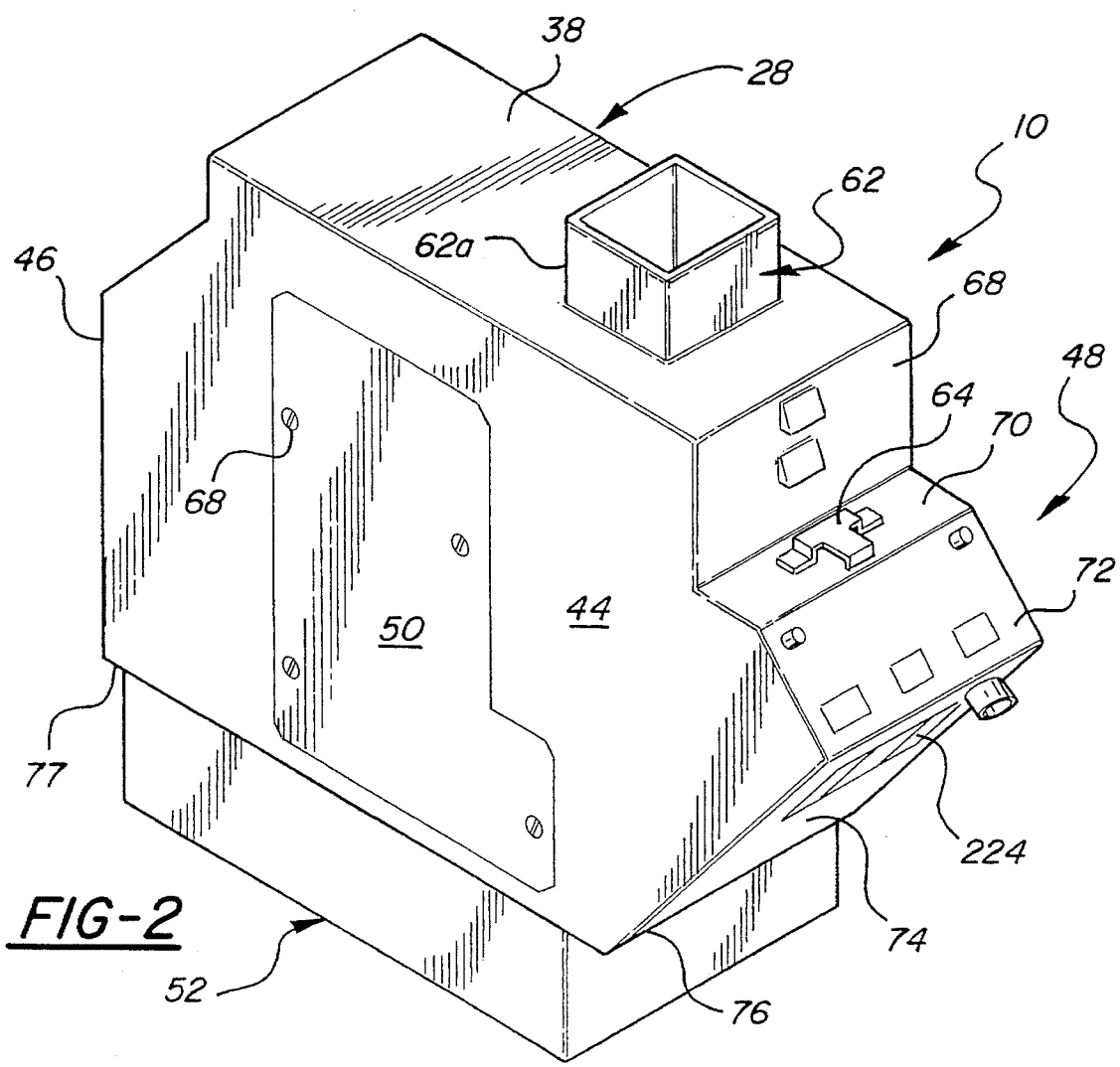
FIG. 2 is a perspective view of the lamphouse of the invention.

The invention lamphouse 10 is seen in FIG. 1 in association with a printer 12. Printer 12 includes pedestals 14 and 16 supporting a table top 18, a film drive 20 positioned on table top 18 defining an optical stage 22, a lens housing 24 positioned over the optical stage, and a print paper housing 26 positioned over the lens housing and operative in known manner to store photographic print paper and move the paper selectively past the lens housing so as to receive images projected upwardly through the optical stage and through the lens housing for printing on the print paper.

Lamphouse 10 is positioned beneath table top 18 between pedestals 14 and 16 in a position centered on the central optical axis 27 of optical stage 22 where it may provide a source of properly filtered and properly timed tricolor light to the optical stage for use in producing photographic prints from negatives moved incrementally past the optical stage by the film drive.

Lamphouse 10 includes a housing 28, a lamp subassembly 30, a trim filter subassembly 32, a cut-off filter subassembly 34, and a circuit board 36.

Housing 28 (FIGS. 2, 3, 4, 5 and 17) includes a top wall 38, a bottom wall 40, a left side wall 42, a right side wall 44, a rear wall 46, a front wall structure 48, a closure panel 50, a power supply unit 52, tracks 54, 56, and 58, stop blocks 60, a mixing chamber 62, a front latch 64, and a rear latch 66.

Front wall structure 48 includes an upper wall 68, a latch wall 70, a display panel 72, and a door 74. Door 74 is hinged along axis 76 so that the door may swing downwardly to provide front access to the interior of the housing. Closure panel 50 is sized to releasably cover an opening 44a in right side wall 44 with fasteners 68 passing through apertures in panel 50 for threaded engagement with threaded holes 44b positioned circumferentially around opening 44a.

Power supply unit 52 includes a rear hinge axis 77 so as to allow the power supply 52 to be swung downwardly about the hinge axis 77 to provide access to the power supply unit.

Tracks 54, 56, and 58 (FIG. 17) are suitably and fixedly secured to the bottom wall 40 of the housing in parallel spaced relation. Each track is aligned with opening 44a and extends from a location proximate right side wall 44 to a location proximate left side wall 42. Each track has a generally U-shape configuration in cross section and includes a bottom wall portion 54a, 56a, 58a fixedly secured to housing bottom wall 40, and upstanding, parallel side walls 54b, 54c, 56b, 56c, 58b, 58c. Each side wall 54b, 54c, 56b, 56c, 58b, 58c includes an upper curvilinear portion 54d, 54e, 56d, 56e, 58d, 58e. A stop block 60 is secured to bottom wall 40 immediately rearwardly of each track at a position proximate but spaced from housing right side wall 44.

Mixing chamber 62 (FIG. 3) includes an upper portion 62a projecting through and above housing top wall 38 and a lower portion 62b positioned within the housing and including downwardly extending wall portions 62c and an angled bottom wall portion 62d coacting to define a lower rearwardly opening window 62e centered on a central light axis 80 of the lamphouse.

Front latch 64 is positioned on latch wall 70 and rear latch 66 is positioned on an angled upper portion 46a of housing rear wall 46. Latches 64 and 66 coact in known manner with latch means on the underface of printer table top 18 to removably secure the housing 10 in position beneath the table top and centered on optical axis 27.

Lamp subassembly 30 (FIGS. 7, 8, 9, and 10) includes a base structure 84, a track structure 86, a stop block 88, a bracket structure 90, a reflector structure 92, a lamp assembly 94, and a connector assembly 96.

Base structure 84 includes an upper plate 98 and a lower plate 100 suitably secured in a laminar configuration.

Track structure 86 includes upper and lower guide plates 86a and 86b and ball assemblies 102 and 104, with each ball assembly 102 and 104 comprising a closed loop ball race. Track structure 86 will be seen to define a tongue configuration extending downwardly from base structure 84 and sized to be slidably received in track 54. Stop block 88 is secured to the upper face of lower base plate 98 proximate the right end of the base structure and arranged for coaction with the stop block 60 positioned rearwardly of track 54.

Bracket structure 90 is secured to the upper face of upper base structure plate 98 and extends upwardly from the base structure.

Reflector structure 92 is supported by bracket structure 90 and includes a reflector dome 106 defining a central forward window 106a, and a mirror plate 108 supported on bracket structure 90 and closing off the rear end of reflector dome 106.

Lamp assembly 94 includes a lamp 110 supported between end fittings 112. End fittings 112 are secured to bracket structure 90 on opposite sides of reflector dome 106 and extend through openings 106b in reflector dome 106 for connection to lamp 110. Lamp 110 is positioned within the reflector dome rearwardly of window 106a on the central axis of the reflector dome.

Connector assembly 96 includes a bracket 114 upstanding from the upper face of upper plate 98 of the base structure proximate the left end of the base structure, a connector 116 supported on the bracket, and leads 118 extending from connector 116 for connection to respective lamp assembly end fittings 112 so that a circuit is completed through lamp 110 when power is supplied to connector 116. Connector 116 is preferably a pin connector of male configuration.

Figure 11:
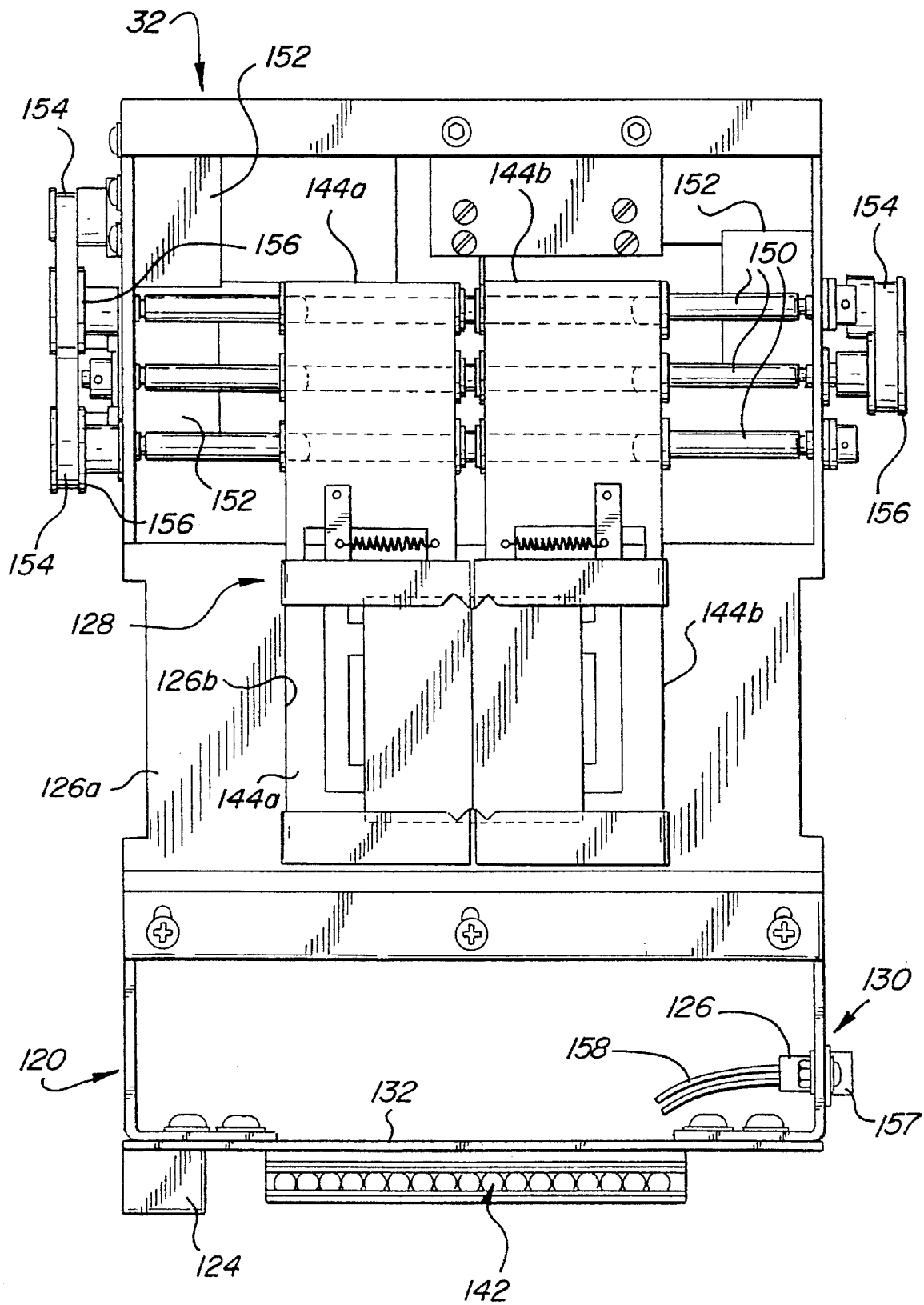

Trim filter subassembly 32 (FIGS. 11, 12 and 13) includes a base structure 120, a track structure 122, a stop block 124, a bracket structure 126, a trim filter assembly 128, and a connector assembly 130.

Base structure 120 includes an upper plate 132 and a lower plate 134 suitably secured together in laminar fashion.

Track structure 122 is secured to the underface of the lower plate 134 of base structure 120 and includes upper and lower side plates 136 and 138 and a pair of ball assemblies 140 and 142. Each ball assembly 140, 142 is arranged as a closed loop ball race with one race position along each side of the track structure. The track structure will be seen to define a tongue configuration extending downwardly from base structure 120 and sized to fit slidably in track 56.

Stop block 124 is secured to the underface of the upper plate 132 of base structure 120 proximate the right hand end of the trim filter subassembly and is designed for coaction with the stop block 60 associated with track 56 upon insertion of the trim filter subassembly into the track 56.

Bracket structure 126 is secured to and upstands from the upper plate 132 of base structure 120. Bracket structure 126 includes a central plate portion 126a defining a window 126b.

Trim filter assembly 128 includes a cyan filter assembly 144 including left and right filters 144a, 144b; a blue filter assembly 146 including left and right filters 146a, 146b; a magenta filter assembly 148 including left and right filters 148a, 148b; threaded shafts 150; motors 152; belts 154; and pulleys 156.

Cyan filters 144a, 144b are threadably positioned on a first threaded shaft 150; blue filters 146a, 146b are threadably received on a second threaded shaft 150; and magenta filters 148a, 148b are threadably received on a third threaded shaft 150. Each threaded shaft 150 has oppositely threaded end portions so that rotation of the respective shaft moves the respective filter pairs inwardly and outwardly with respect to each other to open and close the gap between the filter pairs in response to rotation of the threaded shaft and thereby respectively cover or expose the window 126b in bracket mass portion 126. Each threaded shaft 150 is driven by a motor 152 via a belt 154 driving a pulley 156 secured to the respective threaded shaft so that selective actuation of the motors 150 selectively moves the pairs of filters toward and away from each other.

Connector assembly 130 includes a male pin connector 157 mounted on bracket 126 proximate the left end of the trim filter subassembly and leads 158 interconnecting connector 156 and motors 152.

Figure 14:
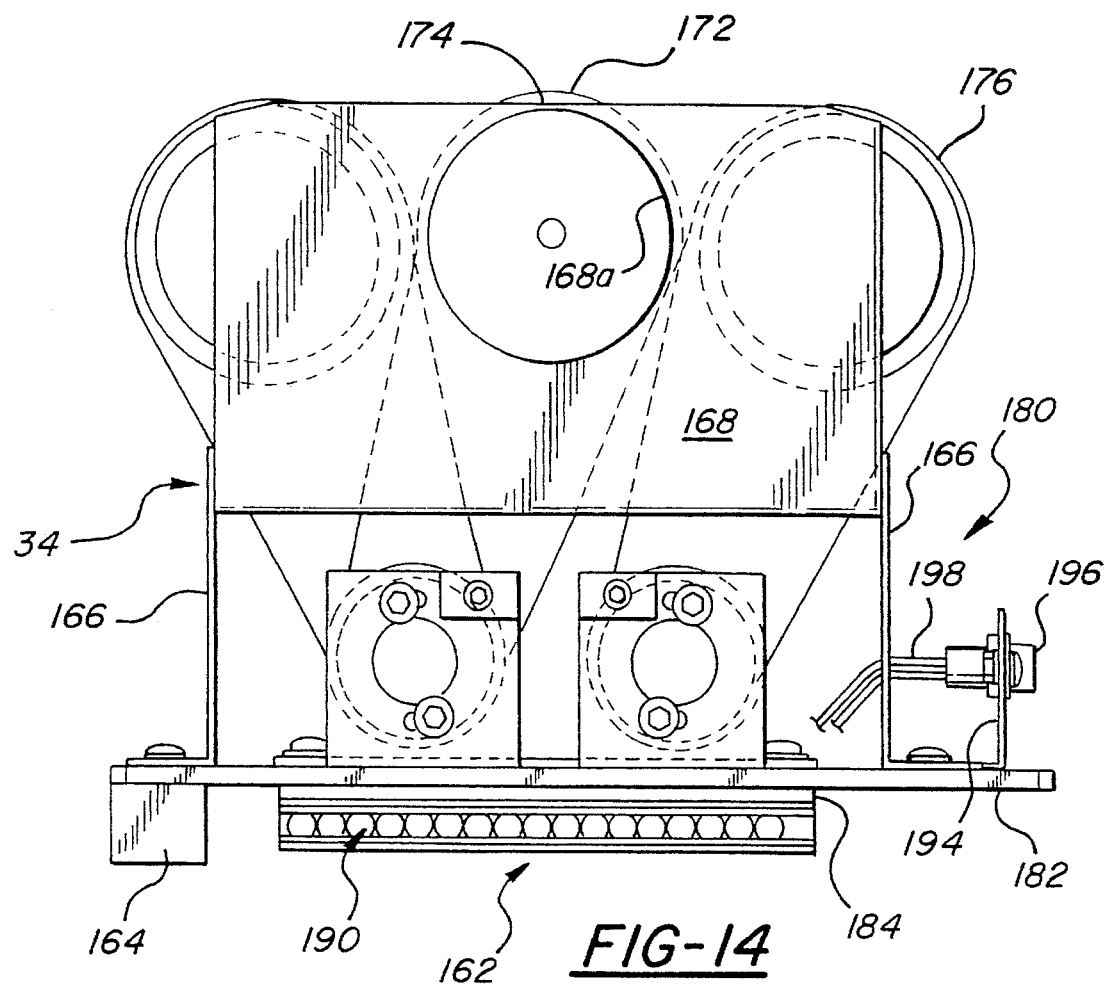
Figure 16:
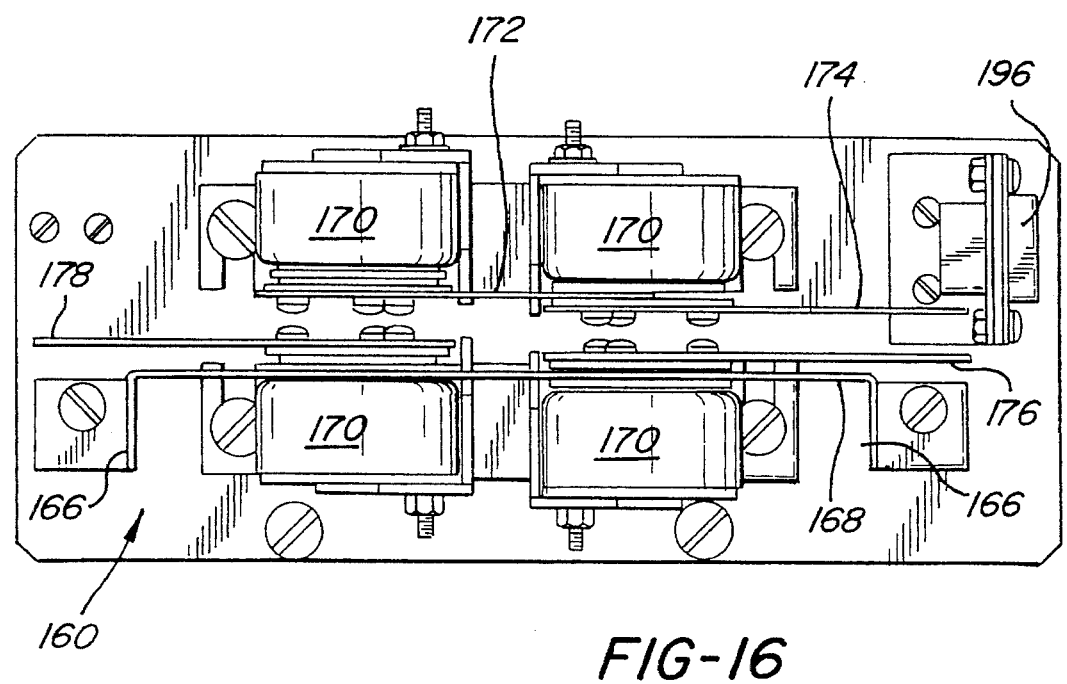
Figure 17:
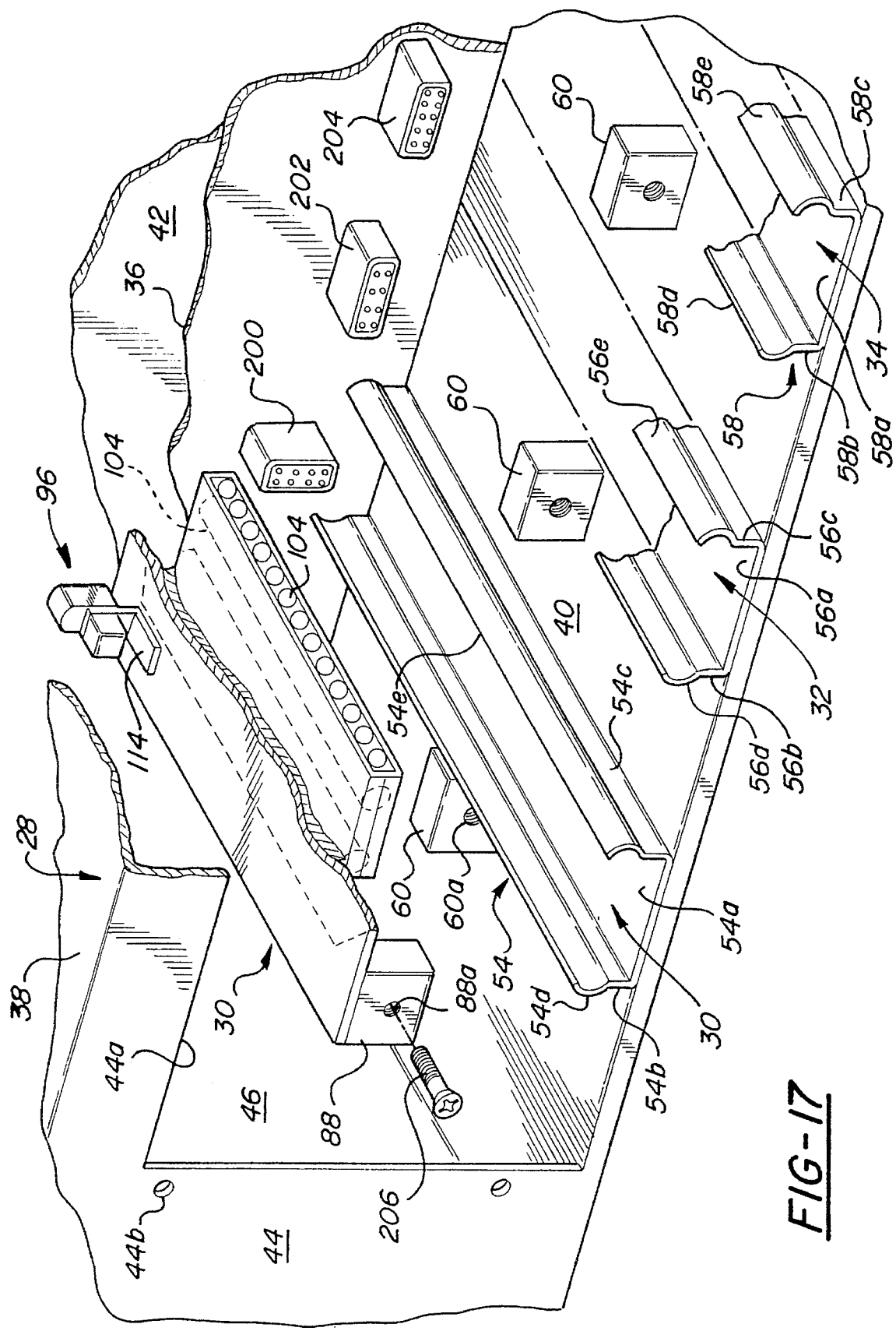
FIG. 17 is a fragmentary perspective view of the invention lamphouse.

Cut off filter subassembly 34 (FIGS. 14, 15, and 16) includes a base structure 160, a track structure 162, a stop block 164, brackets 166, a mask 168, four solenoids 170, a shutter 172, a cyan flag 174, a magenta flag 176, a yellow flag 178, and a connector assembly 180.

Base structure 160 includes an upper plate 182 and a lower plate 184 suitably secured together in laminar fashion.

Track structure 162 is secured to the underface of lower base structure plate 184 and includes upper and lower guide plates 186, 188 and ball assemblies 190 and 192. Each ball assembly 190, 192 comprises a closed loop ball race assembly with one ball race assembly positioned along each side of the track structure. The track structure has a tongue configuration and is sized to fit slidably in track 58.

Stop block 164 is secured to the underface of upper base structure plate 182 proximate the right end of the cut off flag subassembly and is adapted for coaction with the stop block 60 positioned proximate track 58.

Brackets 166 are upstanding from the upper plate 182 of the base structure and are positioned respectively proximate the left and right ends of the base structure.

Mask 168 is supported between the brackets in an upstanding position and defines a central window or aperture 168a.

The four solenoids 170 are positioned on the upper face of base structure upper plate 182 with two solenoids positioned on the rear side of the base structure and two solenoids positioned on the front side of the base structure.

Shutter 172 is operatively associated with one solenoid 170; cyan flag 174 is operatively associated with another solenoid 170; magenta flag 176 is operatively associated with another solenoid 170; and yellow flag 178 is operatively associated with another solenoid 170. The solenoids 170 are operative when energized to move the respective shutter or flag pivotally about the central axis of the solenoid between a position in which the shutter or flag overlies the mask aperture 168a and a position in which the shutter or flag is removed from the mask aperture 168a. Connector assembly 180 includes a bracket 194 secured to the upper face of base structure upper plate 182, a connector 196 secured to the bracket 194, and leads 198 connected to the connector 196 and suitably connected to the solenoids to selectively power the solenoids. Connector 196 is a male pin connector.

Circuit board 36 (FIG. 17) is suitably secured to and positioned against the inboard face of left housing wall 42 and includes female pin connectors 200, 202, and 204 for respective coaction with subassembly male pin connectors 116, 130, and 196. Circuit board 36 will be seen to be positioned in a perpendicular or normal relationship with respect to the axes of tracks 54, 56, and 58 so that as the subassemblies are slid along the tracks, the respective connectors will be moved into telescopic relation with the respective connectors on the circuit board to provide power to the respective subassemblies in response to insertion of the subassemblies into the housing.

In the assembled relation of the lamphouse in association with the photographic printer, the lamphouse is positioned beneath the table 18 of the printer on the optical center line 27 of the printer utilizing latches 64 and 66; lamp subassembly 30 is positioned within the housing 28 on track 54 with ball assemblies 102 and 104 respectively rollably coacting with the arcuate upper portions 54d, 54e of the side walls of track 54, connector 116 inserted into circuit board connector 200 to provide power to the lamp subassembly, stop block 88 positioned in abutting engagement with a stop block 60, a fastener 206 passing through an aperture 88a in stop block 88 and threadably engaging a threaded bore 60a in stop block 60 to fixedly secure the lamp subassembly with respect to the track 54, and reflector aperture 106a centered on the central light axis 80 of the lamphouse; trim filter subassembly 32 is positioned within the housing on track 56 with ball assemblies 140 and 142 respectively rollably engaging the upper arcuate portions 56d, 56e of track 56, stop block 124 positioned in abutting engagement with a stop block 60 and fixedly secured thereto by a fastener 206, connector 130 telescopically received in circuit board connector 202 to provide power to the trim filter subassembly, and the trim filter centered on lamphouse central light axis 80; and cut off filter subassembly 34 is positioned within the lamphouse on track 58 with ball assemblies 190 and 192 respectively rollably engaging the upper portions 58d and 58e of track 58, stop block 154 abuttingly engaging a stop block 60 and fixedly secured to the stop block by a fastener 206, connector 196 telescopically received in circuit board connector 204 to provide power to the cut off filter subassembly, and mask aperture 168a centered on lamphouse central light axis 80.

With the subassemblies positioned within the lamphouse on the respective tracks, closure panel 50 is positioned over housing opening 44a, utilizing fasteners 64, to close up the housing.

In the assembled condition of the subassemblies it will be seen that reflector aperture 106a, trim filters 144, 146, and 148, mask aperture 168a, and the window 62e of the mixing chamber are aligned on lamphouse central light axis 80 so that light generated by lamp 110 and reflected by mirror 108 passes along light axis 80 through reflector aperture 106a, through trim filters 144, 146, and 148, and through mask aperture 168 for entry into mixing chamber window 62e, whereafter the light is reflected upwardly by angled mixing chamber wall 62*d* so that it may pass upwardly along printer optical axis 27 for passage through the negative positioned at the optical stage of the printer so as to facilitate production of a positive print of the image of the negative.

It will be understood that the lamphouse assembly further includes a photometer 210 (FIG. 3) mounted on the inboard face of door 74; a light meter 212 positioned above the photometer; an exhaust fan 214 positioned in the rear end of the housing and operative to draw cooling air through the housing from front to rear with the air entering through vents 216 in the front end of the housing and exiting laterally of the housing through an exhaust duct 218; and a power cord 220 (FIG. 6) including a plug 222 for connection to a suitable source of power and connected to circuit board 36 to provide power to the lamphouse assembly including the various subassemblies.

In the use of the invention lamphouse, trim filters 144, 146, and 148 are typically moved to predetermined and preselected positions utilizing toggle switches 224 positioned on housing door 74 and respectively controlling the motors controlling the cyan, blue, and magenta filters 144, 146, 148 so that, before a given batch of film is processed by the photographic printer, the cyan, blue, and magenta filters have been preset based on analyzation normals. Accordingly, upon the arrival of a frame of film at the optical stage of the printer, lamp 110 is energized, the cyan, blue, and magenta trim filters are prepositioned, and shutter 172 is positioned in a position blocking mask aperture 168*a*. As each successive frame of film arrives at the optical stage, the cut off filter subassembly is operated in a manner to provide tricolor light to the optical stage specifically suited to the requirements of the frame instantaneously positioned at the optical stage.

The control of the cut off filter subassembly will provide the desired tricolor light mixture for each frame and is typically performed utilizing stored data with respect to that frame which is fed to the control for the lamphouse as the respective frame arrives at the optical stage so that the cut off filter subassembly is operated under computer control upon arrival of each frame at the optical stage to provide the specific tricolor light required for optimization of the development of the specific frame. Specifically, as each frame arrives at the optical stage, the shutter 172 is withdrawn from the aperture 168*a* utilizing the appropriate solenoid and the cyan, magenta, and yellow flags are selectively moved into positions in alignment with the mask aperture 168*a* for periods of time determined by the stored data base information for that specific frame of film.

At such time as servicing is required for any of the components of the lamphouse assembly included in subassemblies 30, 32, and 34, door 50 is removed by removal of fasteners 68, the fastener 206 associated with the subassembly containing the component that requires servicing is removed, and the respective subassembly is slid out of the respective track for ready and convenient servicing of the component requiring servicing. As the subassembly is slide out of the track, the electrical connector of the subassembly automatically disconnects from the respective electrical connector on circuit board 36.

Once the defective component has been serviced, the subassembly is reinserted into the housing along the respective track with the respective electrical connector automatically engaging the respective circuit board electrical connector and with the track, once reinstalled, fixedly secured in the housing utilizing the appropriate fastener 206 coacting with the appropriate stop block on the housing and on the respective subassembly. Alternately, upon the removal of a subassembly including a component requiring servicing, a new subassembly may be positioned in the appropriate track so as to enable the lamphouse to continue in service without down time.

The invention lamphouse will be seen to provide ready, convenient, and quick servicing of any defective component of the lamphouse by a simple sliding removal of the appropriate subassembly, thus avoiding the requirement of disassembling the entire lamphouse in the event of a component failure and thus minimizing lamphouse downtime and maximizing lamphouse efficiency.

Whereas a preferred embodiment of the invention has been illustrated and described in detail, it will be apparent that various changes may be made in the disclosed embodiment without departing from the scope or spirit of the invention.

I claim:

1. A lamphouse for use with a photographic printer having an optical stage, said lamphouse including a housing adapted to be positioned on the printer proximate the optical stage and defining a mixing chamber for directing light to the optical stage and a light generating assembly for delivering light to the mixing chamber for delivery to the optical stage, characterized in that:

the light generating assembly is constructed as a plurality of structurally distinct modular subassemblies;

the lamphouse includes a plurality of slide tracks positioned in parallel side by side relation within the housing and each having a first and a second end;

a respective modular subassembly slidably mounted on each slide track;

the housing includes an opening proximate the first ends of the tracks to allow movement of a subassembly through the opening for slidable mounting within the housing on a respective track and allow sliding movement of a subassembly along a respective track for passage out of the opening for repair or replacement;

the lamp house further includes a circuit board positioned within the housing proximate and generally normal to the slide tracks and including a plurality of electrical connectors; and each subassembly includes an electrical connector movable into electrical connection with a respective connector on the circuit board in response to sliding insertion of the subassembly through the housing opening for slidable mounting on the respective track.

2. A lamphouse according to claim 1 wherein the circuit board is positioned within the housing proximate the second ends of the slide tracks.

3. A lamphouse according to claim 1 wherein:

the modular subassemblies include a lamp subassembly, a first filter subassembly positioned between the lamp subassembly and the mixing chamber, and a second filter subassembly positioned between the first filter subassembly and the mixing chamber.

4. A lamphouse according to claim 3 wherein:

the first filter subassembly comprises a trim filter subassembly; and the second filter subassembly comprises a cutoff filter shutter subassembly.

5. A lamphouse according to claim 2 wherein:

the housing includes parallel, spaced first and second side walls, the housing opening is provided in the first side wall, the slide tracks extend generally between the first and second side walls, and the circuit board is mounted proximate the second side wall.

6. A lamphouse according to claim 5 wherein:

each track has an upwardly opening groove configuration; and each modular subassembly includes a tongue structure at the lower end of the subassembly sized to fit slidably in the groove of a respective track.

7. A lamphouse according to claim 6 wherein:

the groove configuration of each track includes parallel upstanding sidewalls; and each tongue structure includes balls rollably engaging the sidewalls of the respective track.

8. A lamphouse according to claim 7 wherein:

the balls of each tongue structure are arranged as a pair of closed-loop ball race assemblies with one ball race assembly rollably engaging each sidewall of the respective track.

9. A lamphouse according to claim 1 wherein:

a plurality of spaced housing stop blocks are positioned within the housing; and each modular subassembly includes a stop block for abutting coaction with a respective housing stop block to determine the fully inserted position of the modular subassembly within the housing.

10. A lamphouse according to claim 9 wherein the lamphouse further includes fasteners operative to fixedly but releasably secure the respective modular subassembly stop blocks to the housing stop block so as to fixedly but readily releasably secure each modular subassembly in the housing.

11. A lamphouse for use with a photographic printer and operative to deliver a filtered supply of light to the optical stage of the printer, the lamphouse including:

a housing defining an opening and a mixing chamber;

a plurality of slide tracks positioned in the housing in parallel side by side relation and each having an end positioned proximate the housing opening;

a modular lamp assembly slidably and removably mounted on one of said tracks;

a first modular filter subassembly slidably and removably mounted on another of said tracks in a position between the lamp subassembly and the mixing chamber;

a second modular filter subassembly slidably and removably mounted on another of said tracks in a position between the first filter subassembly and the mixing chamber;

an electrical connector mounted on each subassembly for powering the subassembly; and a plurality of mating electrical connectors positioned in the housing for respective electrical coaction with the subassembly electrical connectors whereby each subassembly may be readily installed in the housing by passing it through the housing opening, slidably mounting it on a respective track, and connecting its electrical connector to a respective housing electrical connector, and each subassembly may be readily removed from the housing for replacement or repair by disconnecting its electrical connector from the respective housing electrical connector and sliding it outwardly along the respective track for outward passage through the housing opening.

12. A lamphouse according to claim 11 wherein:

the first modular filter subassembly comprises a trim filter subassembly; and the second modular filter subassembly comprises a cutoff filter shutter subassembly.

13. A lamphouse according to claim 11 wherein:

each track has an upwardly opening groove configuration; and each modular subassembly includes a tongue structure at the lower end of the subassembly sized to fit slidably in the groove of a respective track.

14. A lamphouse according to claim 13 wherein:

the groove configuration of each track includes parallel upstanding sidewalls; and each tongue structure includes balls rollably engaging the sidewalls of the respective track.

15. A lamphouse according to claim 14 wherein the balls of each tongue structure are arranged as a pair of closed-loop ball race assemblies with one ball race assembly rollably engaging each sidewall of the respective track.

16. A lamphouse according to claim 11 wherein:

the lamphouse includes a circuit board positioned within the housing generally normal to the slide tracks;

the housing electrical connectors are mounted on the circuit board; and each modular subassembly electrical connector is movable into electrical connection with a respective connector on the circuit board in response to sliding insertion of the modular subassembly into the housing on the respective track.

17. A lamphouse according to claim 12 wherein:

a plurality of spaced housing stop blocks are positioned within the housing; and each modular subassembly includes a stop block for abutting coaction with a respective housing stop block to determine the fully inserted position of the modular subassembly within the housing.

18. A lamphouse according to claim 17 wherein the lamphouse further includes fasteners operative to fixedly but releasably secure the respective modular subassembly stop blocks to the housing stop blocks so as to fixedly but releasably secure each modular subassembly in the housing.

* * * * *

UNITED STATES PATENT AND TRADEMARK OFFICE
CERTIFICATE OF CORRECTION

PATENT NO. : 5,455,655
DATED : October 3, 1995
INVENTOR(S) : Ray Hicks

It is certified that error appears in the above-indentified patent and that said Letters Patent is hereby corrected as shown below:

Column 4, Line 24, delete "upper face" and insert --lower face--.

Column 4, Line 24, delete "lower base" and insert --upper base--.

Column 7, Line 58, delete "slide" and insert --slid--.

Column 10, Line 43, delete "claim 12" and insert --claim 11--.

Signed and Sealed this

Twenty-sixth Day of December, 1995

Attest:

BRUCE LEHMAN

*Attesting Officer*    *Commissioner of Patents and Trademarks*